UNITED STATES PATENT OFFICE.

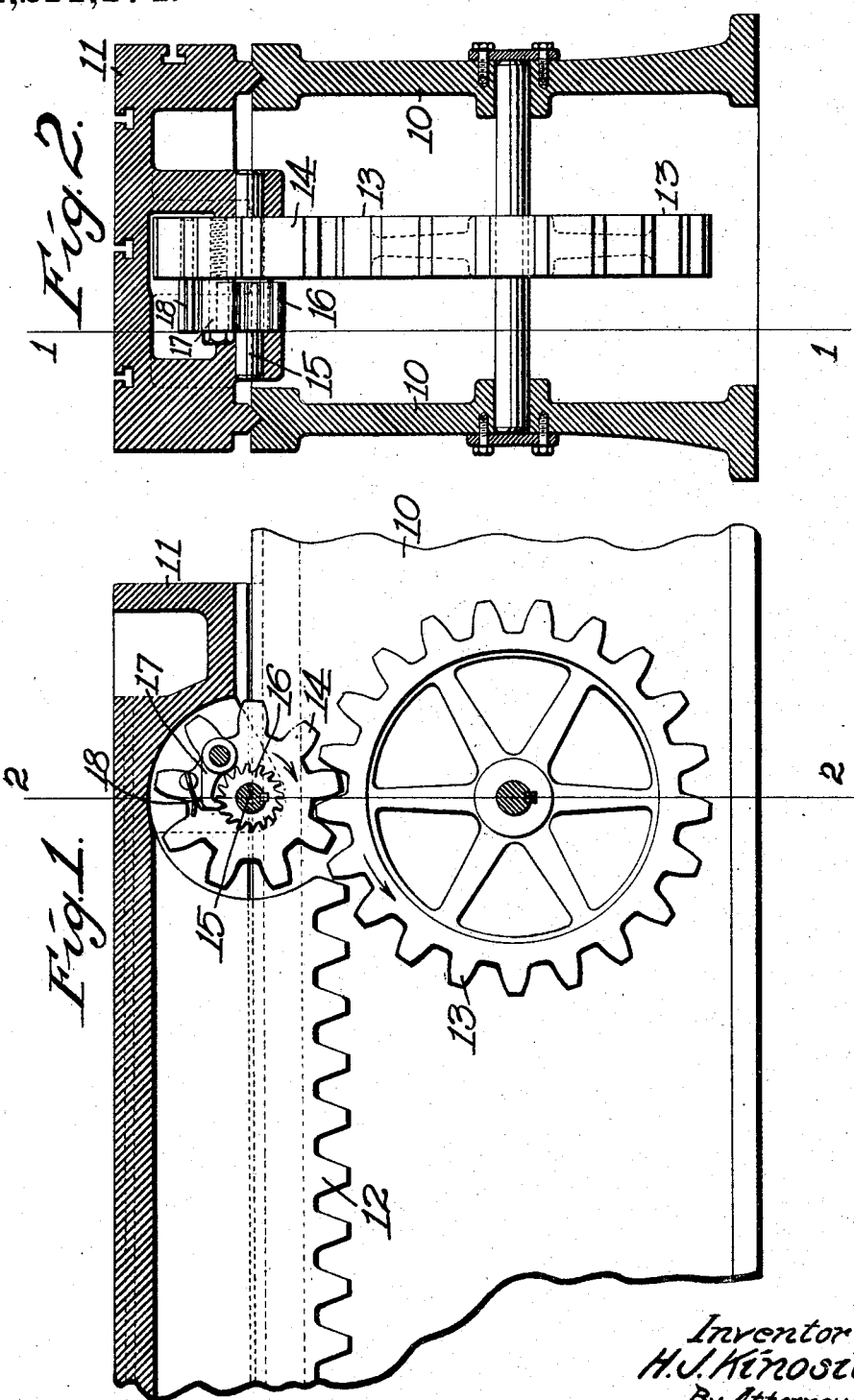

HARRY J. KINOSIAN, OF WORCESTER, MASSACHUSETTS.

ATTACHMENT FOR PLANERS.

1,211,174. Specification of Letters Patent. Patented Jan. 2, 1917.

Application filed April 29, 1916. Serial No. 94,453.

*To all whom it may concern:*

Be it known that I, HARRY J. KINOSIAN, a citizen of Armenia, and subject of the Turkish Empire, residing at Worcester, in the county of Worcester and State of Massachusetts, have invented a new and useful Attachment for Planers, of which the following is a specification.

This invention relates to a device for preventing a planer table from moving into a position in which it will be out of connection with the operating gear. Planer tables are usually provided with dogs for shifting the belt at each end of the stroke, these coming into contact with dogs on the bed, either of which may be adjustable. In spite of this fact, however, the adjustable dogs may get loose or for other reasons the planer table is capable of running beyond the gear which operates it, and some times even being forced off the bed.

The principal object of this invention is to provide a simple and convenient means for preventing this difficulty.

Reference is to be had to the accompanying drawings, in which—

Figure 1 is a longitudinal sectional view on the line 1—1 of Fig. 2 of a planer showing a preferred form of this invention, and Fig. 2 is a transverse sectional view on the line 2—2 of Fig. 1 showing the gears in elevation.

The invention is shown as applied to a planer having the usual bed 10 and sliding table 11, which by means of its rack 12, is operated by gear 13 in the usual way. The reversing dogs and reversing mechanism are not shown as the invention is intended to be used with the ordinary constructions for this purpose. In order to prevent the rack 12 passing so far beyond the gear 13 that it will be out of mesh with it so that upon reversal it will be carried back, the following mechanism is shown:—Meshing with the gear 13 is a pinion 14 freely rotatable on a non-rotatable transverse shaft 15. A ratchet wheel 16 is keyed to this shaft so as to remain stationary. Pivotally mounted on the pinion 14 is a pawl 17 adapted to engage the teeth of the ratchet wheel and a spring 18 is designed to engage the pawl and force it into the teeth.

It will be understood that one of these attachments is applied to each end of the planer, the only difference being that the ratchet wheel is turned one way at one end and the other way at the other end. When the gear 13 forces the rack 12 beyond it so as to be out of mesh with the gear the teeth of the gear come into mesh with the teeth of the pinion 14, and on account of the slant of its teeth the ratchet wheel and pawl do not prevent the free rotation in that direction of the pinion. Therefore, the continued rotation of the wheel 13 will not advance the table any farther as it simply rotates the wheel 14. Now when the drive reverses, however, the pawl 17 on account of the straight sides of the teeth will prevent the pinion from rotating. The pinion 14, therefore, acts at this time as a fixed part of the rack 12 and reversal of the driving mechanism results in throwing the gear 13 into mesh with the rack immediately.

It will be understood, of course, that when the table gets by for any reason the operator necessarily notices it and stops or reverses the machine. With this mechanism he is free to reverse it at once as no harm will be done and practically no time lost.

Although I have illustrated and described only a single form of the invention I am aware of the fact that many modifications can be made therein by any person skilled in the art without departing from the scope of the invention as expressed in the claims. Therefore, I do not wish to be limited to all the details of construction herein shown and described, but What I do claim is:—

1. The combination with a planer table, its rack, and a gear for operating the rack adapted to be reversed at the end of the stroke, of rotary means independent of the reversing means adapted to remain constantly in mesh with the gear when the rack moves beyond it for returning the rack into mesh with the gear upon reversal.

2. In a planer the combination with a planer table rack and a gear for operating it, of a pinion mounted to move with the rack and capable of meshing with the gear and rotatable in one direction only.

3. The combination with a planer table, rack, and its gear, of a pinion located at the end of the rack and having teeth in line with the teeth of the rack and adapted to mesh with the teeth of the gear, said pinion being freely rotatable on its axis, a fixed ratchet wheel, and means coöperating with the ratchet wheel for allowing said pinion to rotate in one direction and preventing it from rotating in the other.

In testimony whereof I have hereunto set my hand.

HARRY J. KINOSIAN.

Copies of this patent may be obtained for five cents each, by addressing the "Commissioner of Patents, Washington, D. C."